US010009238B2

(12) United States Patent
Iyer et al.

(10) Patent No.: US 10,009,238 B2
(45) Date of Patent: *Jun. 26, 2018

(54) CROSS-CLOUD MANAGEMENT AND TROUBLESHOOTING

(71) Applicant: Microsoft Technology Licensing, LLC, Redmond, WA (US)

(72) Inventors: Kannan C. Iyer, Sammamish, WA (US); Eric B. Watson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/983,509

(22) Filed: Dec. 29, 2015

(65) Prior Publication Data
US 2016/0119202 A1   Apr. 28, 2016

Related U.S. Application Data

(63) Continuation of application No. 13/111,956, filed on May 20, 2011, now Pat. No. 9,223,632.

(51) Int. Cl.
*H04L 12/26* (2006.01)
*G06F 9/50* (2006.01)
(Continued)

(52) U.S. Cl.
CPC ............ *H04L 43/04* (2013.01); *G06F 9/5072* (2013.01); *G06F 11/0709* (2013.01);
(Continued)

(58) Field of Classification Search
None
See application file for complete search history.

(56) References Cited

U.S. PATENT DOCUMENTS

2002/0049759 A1   4/2002   Christensen
2002/0055994 A1   5/2002   Ota et al.
(Continued)

FOREIGN PATENT DOCUMENTS

CN   101460907 A   6/2009
CN   101883029 A   11/2010
(Continued)

OTHER PUBLICATIONS

"Supplementary Search Report Issued in European Patent Application No. 12789586.0", dated Mar. 7, 2016, 8 Pages.
(Continued)

*Primary Examiner* — Jenee Holland
(74) *Attorney, Agent, or Firm* — Davin Chin; Chin IP, PLLC (57) ABSTRACT

A cloud management system is described herein that provides the ability for an application to span two or more clouds while allowing operation, management, and troubleshooting of the distributed application as a single application. The system provides infrastructure that communicates across datacenters for execution and for centralizing knowledge of instances of an application that are running at different locations. The infrastructure provided by the system monitors both the application and connections between the clouds, with intelligence to know if issues are within the application or because of the connection between the clouds. The system coordinates management functions across multiple cloud platforms/locations. Thus, the cloud management system creates a single monitoring and troubleshooting interface and knowledge and execution fabric across multiple clouds so that applications spread across multiple clouds can be monitored, managed, and debugged more easily.

20 Claims, 4 Drawing Sheets (51) Int. Cl.
  *G06F 11/07* (2006.01)
  *G06F 11/14* (2006.01)
  *G06F 11/20* (2006.01)

(52) U.S. Cl.
  CPC ........ *G06F 11/079* (2013.01); *G06F 11/0751* (2013.01); *G06F 11/0772* (2013.01); *G06F 11/0784* (2013.01); *H04L 43/06* (2013.01); *G06F 11/1482* (2013.01); *G06F 11/203* (2013.01)

(56) References Cited

U.S. PATENT DOCUMENTS

| | | | |
|---|---|---|---|
| 2002/0087680 | A1 | 7/2002 | Cerami et al. |
| 2002/0099786 | A1 | 7/2002 | Chun |
| 2002/0099818 | A1 | 7/2002 | Russell et al. |
| 2002/0103886 | A1 | 8/2002 | Rawson |
| 2002/0112039 | A1 | 8/2002 | Ullman |
| 2002/0112182 | A1 | 8/2002 | Chang et al. |
| 2002/0120741 | A1 | 8/2002 | Webb et al. |
| 2002/0143593 | A1 | 10/2002 | Takata et al. |
| 2002/0147764 | A1 | 10/2002 | Krupczak |
| 2002/0161875 | A1 | 10/2002 | Raymond |
| 2002/0161876 | A1 | 10/2002 | Raymond |
| 2002/0188708 | A1 | 12/2002 | Takahashi et al. |
| 2003/0061334 | A1 | 3/2003 | Hirata et al. |
| 2005/0193109 | A1 | 9/2005 | Hudis et al. |
| 2005/0262229 | A1 | 11/2005 | Gattu et al. |
| 2006/0031446 | A1 | 2/2006 | Hamedi |
| 2007/0064714 | A1* | 3/2007 | Bi .............. H04L 41/0631 370/401 |
| 2007/0198554 | A1 | 8/2007 | Liu |
| 2008/0010289 | A1 | 1/2008 | Markel et al. |
| 2008/0059487 | A1 | 3/2008 | Mi et al. |
| 2008/0281731 | A1 | 11/2008 | Takata et al. |
| 2009/0013027 | A1 | 1/2009 | Tanaka |
| 2009/0300149 | A1 | 12/2009 | Ferris et al. |
| 2009/0300152 | A1 | 12/2009 | Ferris |
| 2009/0300423 | A1 | 12/2009 | Ferris |
| 2009/0327471 | A1 | 12/2009 | Astete et al. |
| 2010/0039932 | A1 | 2/2010 | Wen et al. |
| 2010/0042720 | A1 | 2/2010 | Stienhans et al. |
| 2010/0088150 | A1 | 4/2010 | Mazhar et al. |
| 2010/0131624 | A1 | 5/2010 | Ferris |
| 2010/0169477 | A1 | 7/2010 | Stienhans et al. |
| 2010/0217850 | A1 | 8/2010 | Ferris |
| 2010/0223378 | A1 | 9/2010 | Wei |
| 2010/0299366 | A1 | 11/2010 | Stienhans et al. |
| 2010/0306354 | A1 | 12/2010 | DeHaan et al. |
| 2010/0306767 | A1 | 12/2010 | DeHaan |
| 2011/0016090 | A1 | 1/2011 | Krishnaprasad et al. |
| 2011/0029673 | A1 | 2/2011 | Jaisinghani |
| 2011/0055377 | A1 | 3/2011 | DeHaan |
| 2011/0055378 | A1 | 3/2011 | Ferris et al. |
| 2011/0078303 | A1 | 3/2011 | Li et al. |
| 2011/0131134 | A1 | 6/2011 | Ferris et al. |
| 2011/0167469 | A1 | 7/2011 | Letca et al. |
| 2011/0179162 | A1 | 7/2011 | Mayo et al. |
| 2012/0011077 | A1 | 1/2012 | Bhagat |
| 2012/0079480 | A1 | 3/2012 | Liu |
| 2012/0259909 | A1 | 10/2012 | Bachelor et al. |
| 2012/0290460 | A1 | 11/2012 | Curry et al. |
| 2012/0297016 | A1 | 11/2012 | Iyer et al. |

FOREIGN PATENT DOCUMENTS

| | | |
|---|---|---|
| JP | 2006344025 A | 12/2006 |
| JP | 2007148738 A | 6/2007 |
| JP | 2008217735 A | 9/2008 |
| JP | 2009501386 A | 1/2009 |
| JP | 2011054043 A | 3/2011 |
| JP | 2011090429 A | 5/2011 |

OTHER PUBLICATIONS

"First Office Action Issued in Chinese Patent Application No. 201280024366.1", dated Jul. 30, 2015, 12 Pages.

"Second Office Action Issued in Chinese Patent Application No. 201280024366.1", dated Mar. 30, 2016, 6 Pages.

"Cloud", Retrieved at http://www.riverbed.com/us/solutions/cloud.sub.-services/index.php>&g- t;, Retrieved Date : Dec. 22, 2010, pp. 2.

"International Search Report", dated Dec. 27, 2012, Application No. PCT/US2012/038647, Filed Date: May 18, 2012, pp. 10.

"Migrating Your Applications and Processes to the Cloud: Practical Checklist", Retrieved at <<http://www.getapp.com/blog/tag/cloud-based-app/>>, Dec. 17, 2010, pp. 29.

Buyya, et al., "InterCloud: Utility-Oriented Federation of Cloud Computing Environments for Scaling of Application Services", Retrieved at <<http://www.cloudbus.org/papers/InterCloud2010.pdf>>, 2010, pp. 19.

Considine, John, "Moving to the Cloud: Managing your Environment", Retrieved at <<http://www.cloudswitch.com/page/managing-cloud-environment-cloud-management>>, Nov. 12, 2009, pp. 4.

Sahrawat, Nipun., "Distributed App Management gets Easier for Spring Developers", Retrieved at <<http://www.thectoforum.com/content/distributed-app-management-get- s-easier-spring-developers>>, Nov. 9, 2010, pp. 2.

Shinder, Debra Littlejohn, "10 reasons to use Azure for your cloud apps", Retrieved at <<http://blogs.techrepublic.com.com/10things/?p=1282>>, Jan. 6, 2010, pp. 8.

Vaughan, Gordon, "Management Solutions for Cloud Ecosystems", Retrieved at <<http://blogs.netapp.com/cloud/2010/10/management-solutions-for-cl- oud-ecosystems.html>>, Oct. 15, 2010, pp. 2.

"Office Action Issued in Russian Patent Application No. 2013151607", dated Apr. 19, 2016, 4 Pages. (W/o English Translation).

"Notice of Acceptance in AU Patent Application No. 2012259086", dated Sep. 8, 2016, 3 Pages.

"Notice of Rejection Issued in Japanese Patent Application No. 2014-512899", dated Nov. 11, 2015, 4 Pages, including translation.

"Patent Examination Report No. 1 in AU Patent Application No. 2012259086", dated Jul. 15, 2016, 4 Pages.

"Notification to Grant Patent Rights for Invention Issued in Chinese Patent Application No. 201280024366.1", dated Oct. 9, 2016, 4 Pages. (W/ English Translation).

"Decision on Grant Issued in Russian Patent Application No. 2013151607", dated Jul. 25, 2016, 14 Pages. (W/ English Translation).

"Notice of Allowance in MX Patent Application No. MX/a/2013/013577", dated Dec. 1, 2016, 1 Page.

"Notice of Allowance Issued in Japanese Patent Application No. 2014-512899", dated Jun. 28, 2016, 3 Pages.

"Office Action Issued in European Patent Application No. 12789586.0", dated Dec. 22, 2017, 5 Pages.

"Office Action Issued in Korean Patent Application No. 10-2013-7030613", dated Mar. 7, 2018, 6 Pages.

* cited by examiner

CROSS-CLOUD MANAGEMENT AND TROUBLESHOOTING

BACKGROUND

Datacenters provide servers for running large applications. Enterprises often use datacenters to run core business functions such as sales, marketing, human resources, billing, product catalogs, and so forth. Datacenters may also run customer-facing applications, such as web sites, web services, email hosts, databases, and many other applications. Datacenters are typically built by determining an expected peak load and providing servers, network infrastructure, cooling, and other resources to handle the peak load level. Datacenters are known for being very expensive and for being underutilized at non-peak times. They also involve a relatively high management expense in terms of both equipment and personnel for monitoring and performing maintenance on the datacenter. Because almost every enterprise uses a datacenter of some sort, there are many redundant functions performed by organizations across the world.

Cloud computing has emerged as one optimization of the traditional datacenter. A cloud is defined as a set of resources (e.g., processing, storage, or other resources) available through a network that can serve at least some traditional datacenter functions for an enterprise. A cloud often involves a layer of abstraction such that the applications and users of the cloud may not know the specific hardware that the applications are running on, where the hardware is located, and so forth. This allows the cloud operator some additional freedom in terms of rotating resources into and out of service, maintenance, and so on. Clouds may include public clouds, such as MICROSOFT™ Azure, Amazon Web Services, and others, as well as private clouds, such as those provided by Eucalyptus Systems, MICROSOFT™, and others. Companies have begun offering appliances (e.g., the MICROSOFT™ Azure Appliance) that enterprises can place in their own datacenters to connect the datacenter with varying levels of cloud functionality.

Enterprises with datacenters incur substantial costs building out large datacenters, even when cloud-based resources are leveraged. Enterprises often still planned for "worst-case" peak scenarios and thus include an amount of hardware at least some of which is rarely used or underutilized in terms of extra processing capacity, extra storage space, and so forth. This extra amount of resources incurs a high cost for little return. Customers using cloud based computing on premise expect to be able to use capacity in another compatible cloud (e.g., a second instance of their own in another location, Microsoft's public cloud, and so forth) for peak capacity times, for disaster recover scenarios, or just for capacity management. Doing so is much less expensive than building out for the worst-case scenario and then doubling for redundancy. In addition, they expect to be able to manage (e.g., troubleshoot, operate) applications split across multiple clouds. Today, applications, cloud management, and troubleshooting do not operate across clouds or other datacenters.

SUMMARY

A cloud management system is described herein that provides the ability for an application to span two or more clouds (which may be across great distances), while allowing operation, management, and troubleshooting of the distributed application as a single application. The system provides infrastructure that communicates across datacenters for execution and for centralizing knowledge of instances of an application that are running at different locations. In some cases, the system provides a computing appliance that an enterprise can place in its own private datacenter that allows an administrator to distribute at least some application loads to a public cloud or other separate locations, while providing unified management via the computing appliance. The infrastructure provided by the system monitors both the application and connections between the clouds, with intelligence to know if issues are within the application or because of the connection between the clouds. The system coordinates management functions across multiple cloud platforms/locations. If an administrator wants to debug the application, the system allows live debugging at the correct location through a seamless, unified interface. Thus, the cloud management system creates a single monitoring and troubleshooting interface and knowledge and execution "fabric" across multiple clouds so that applications spread across multiple clouds can be monitored, managed, and debugged more easily.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A cloud management system is described herein that provides the ability for an application to span two or more clouds (which may be across great distances), while allowing operation, management, and troubleshooting of the distributed application as a single application. The system provides infrastructure that communicates across datacenters for execution and for centralizing knowledge of instances of an application that are running at different locations. For example, the system may centralize logging, performance tracking, and other management functions, regardless of where the application is running. In some cases, the system provides a computing appliance that an enterprise can place in its own private datacenter that allows an administrator to distribute at least some application loads to a public cloud or other separate locations, while providing unified management via the computing appliance.

The infrastructure provided by the cloud management system monitors both the application and connections between the clouds, with intelligence to know if issues are within the application or because of the connection between the clouds. The system coordinates management functions across multiple cloud platforms/locations (from one cloud's infrastructure, tasks are coordinated to execute across two or more clouds). If an administrator wants to debug the application, the system allows live debugging at the correct location through a seamless, unified interface. Thus, the cloud management system creates a single monitoring and troubleshooting interface and knowledge and execution "fabric" across multiple clouds so that applications spread across multiple clouds can be monitored, managed, and debugged more easily.

Figure 1:
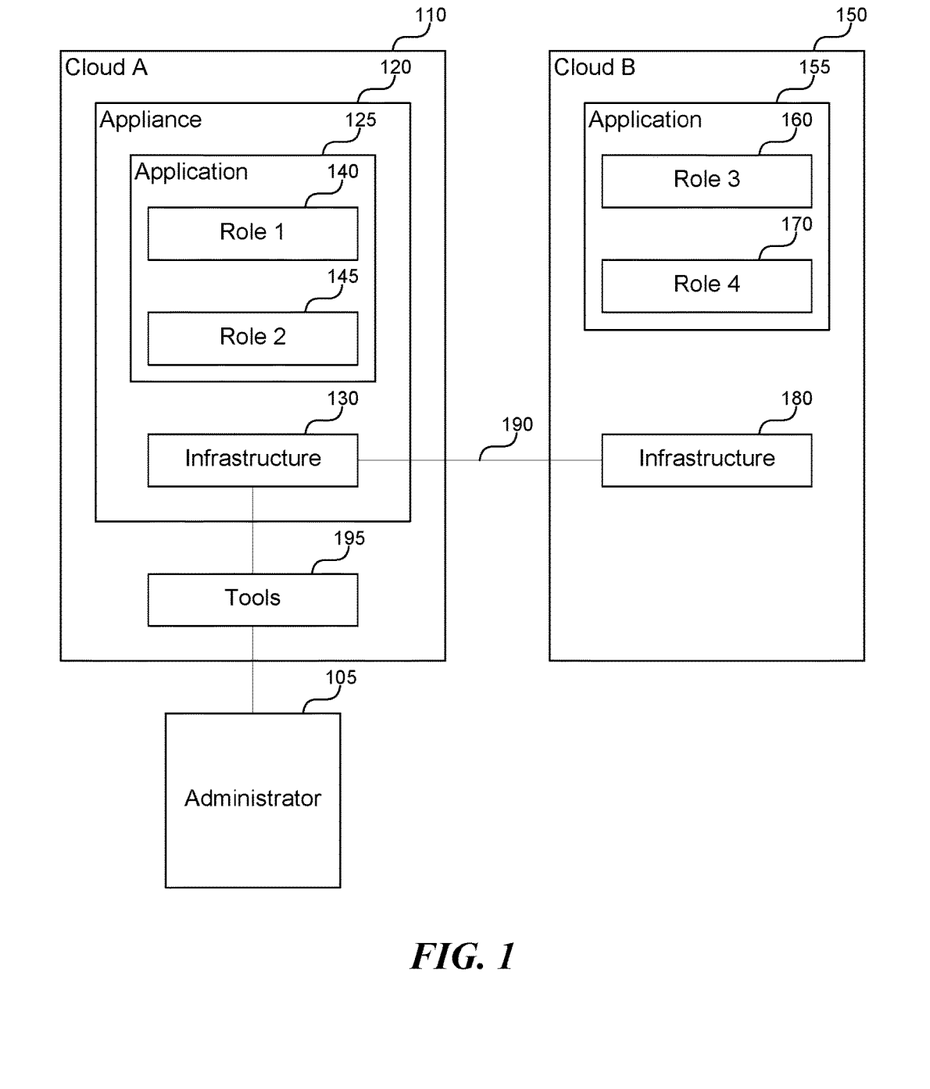
FIG. 1 illustrates an application running in two clouds with associated management infrastructure, in one embodiment.

FIG. 1 illustrates an application running in two clouds with associated management infrastructure, in one embodiment. In some embodiments, the cloud management system involves the application (and/or the administrator) using infrastructure in one cloud that has the data/access to the data at all locations to be able to fully monitor/troubleshoot the application. As an example, consider an application with instances running in two clouds, cloud 110 and cloud 150 as shown in FIG. 1. Cloud 110 includes a MICROSOFT™ Azure appliance instance 120 that includes infrastructure 130. The appliance instance 120 includes application instance 125 that is running role 140 and role 145. A second cloud 150 includes application instance 155 that is running role 160 and role 170. The second cloud 150 also includes infrastructure 180. The appliance instance 120 knows about each of the roles and that they are part of the same application. The infrastructure plumbing at each location allows the appliance instance 120 to retrieve information about role 160 and role 170 executing at the second cloud 150. The system can distribute either individual roles, whole applications, or both. With all of the management data (e.g., logs from the applications, machines, and infrastructure), the system can assess the health of the application just as if all of the roles were local by applying pre-defined health rules. The system can also see the infrastructure health across both locations as well as the connection 190 in between to assess if a problem is occurring with the application or the infrastructure/network.

Similarly, when automated or manual troubleshooting or remediation steps are needed, the infrastructure 130 in cloud 110 can coordinate with the infrastructure 180 in cloud 150 to provide troubleshooting and debugging support. For example, the system fabric can reach across locations to execute an application wide update, shutdown, and so forth. Those of ordinary skill in the art will recognize numerous ways to perform cross-location control. For example, infrastructure 130 may directly control infrastructure 180, infrastructure 130 may request infrastructure 180 to execute on infrastructure 130's behalf, and so forth. Likewise, with operator/administrator troubleshooting tools (e.g., monitoring visualization, alerting, log and configuration data viewing, and so on), the location of the applications and infrastructure is available and logically displayed, but does not involve separate tools and mental gymnastics from the administrator to put together. For instance, when troubleshooting and viewing data on all roles, if the administrator 105's next step is using one or more tools 195 to view the application's logs or start a remote session to the role instance, the system connects the administrator 105 directly, regardless of at which location the role is residing.

The design of the cloud management system provides simplified and consistent running of a service across multiple clouds/location. The system moves the definition of "a computing resource" from a server, beyond a datacenter to a portion of the internet (the datacenters and the connection between them). This allows service level agreements (SLAs) to be defined, monitored, and managed at the service level—which is what service owners often care most about.

In some embodiments, the cloud management system works in cooperation with a cloud migration system that seamlessly migrates applications from one location to another as needed, called bursting. The cloud migration system provides capacity management and disaster recovery by detecting peak load conditions and automatically moving computing to another source (and back) and by providing computing across two or more clouds and moving completely to one in the case of a disaster at one site. This allows enterprises to plan for local resources for a sustained level of load and to leverage cloud-based resources for peak or other unusual loads. In many cases, an enterprise's business is such that a particular time of year is busier, and extra resources may only be needed during those times. For example, tax-planning enterprises are particular busy in mid-April, e-commerce sites experience holiday rushes around Thanksgiving and Christmas, and so on. The cloud migration system monitors loads within a datacenter and detects a threshold that indicates that the current load is nearing the datacenter's capacity. For example, the system may monitor central processing unit (CPU) usage, memory usage, storage usage, network bandwidth, and other metrics to determine how well the datacenter is handling the current load. The system may also observe trends (e.g., a rate of acceleration of resource usage) to determine whether the threshold has been or will soon be reached.

Upon detecting that the threshold will be reached, the cloud migration system facilitates an orderly move of at least some datacenter load to another datacenter or cloud-based resources. For example, the system may migrate some peak load to a public cloud. Because cloud pricing models may vary, the system may factor cost into the decision. For example, the system may prefer to host as much load as possible at the enterprise datacenter to reduce cost, while leveraging cloud resources only to the extent needed to satisfy client requests. The system may also provide management and monitoring tools that provide a consistent experience for information technology (IT) personnel regardless of where particular loads are run (e.g., locally within the enterprise or publicly using a cloud). The system may also provide planning tools to help decide appropriate workloads or applications for moving to other resources during high loads. For example, applications may have various compliance/regulatory or networking/design limitations that make them more or less suitable for migration. The system can also be used as a disaster recovery architecture at a datacenter/network level to manage fast workload transition in case of disaster. If a datacenter resource permanently fails, the system can quickly and efficiently migrate additional load to the cloud or other resources so that clients of the datacenter are unaffected or are less affected by the failure. Thus, the cloud migration system allows enterprises to build smaller and more efficient datacenters that leverage other resources for rare extra loads.

The cloud management system works with the cloud migration system to provide seamless management and troubleshooting as applications are migrated from one location to another. As described above, the cloud migration system may move resources between a datacenter and the cloud on a temporary (i.e., bursting) or permanent (i.e., disaster recovery) basis. Temporary movements include bursting an application or other load for a short time period to handle a peak or other high load that exceeds the datacenter's capacity. A temporary movement may include bursting an entire application or splitting the application's load across two or more locations. Permanent movements include longer-term migration of loads due to a failure of hardware in the datacenter, a more sustained increase in capacity needs, a desire to globally distribute an application with dynamic load balancing, and so forth. Following are several example scenarios in which the system may be used by an enterprise.

In the first example, an enterprise bursts application load to a public cloud to manage capacity. The business decision maker (i.e., CEO, CFO, or VP Marketing/sales) and datacenter systems administrator decide it would be more cost effective and provide a better customer experience to burst some work to the public cloud at their top three peak day level of use/traffic per year, and maintain their own datacenter (potentially with a cloud appliance) at their peak monthly usage level. They sign business agreements with the cloud provider to burst work into the cloud and project estimates of when and how much work that would be. Their account is set up and the information entered into the cloud appliance. During a planning phase, the administrator runs a test with a test application from the cloud provider that ensures the connection is working properly. The administrator then sets the capacity values (e.g., threshold) for initiating bursting of applications that keep capacity at the specified level in a capacity management tool. The administrator goes into the tool to further specify the applications that are eligible to move in this situation (e.g., no regulatory issues with temporary movement, good technical fit).

The day comes when use exceeds the limits and the system automatically moves applications to the public cloud. Alerts are thrown in the monitoring/usage systems when capacity is within 5% of the bursting being initiated, when the system does burst, what the system bursts, and when the system brings the applications back. An explicit log is kept of all compute resources and/or storage moved and the administrator is alerted to go to their public cloud account for billing. A review of the bursting parameters and applications tagged as movable is reviewed in the regular capacity planning meetings with in the enterprise datacenter group and management.

In a second example, an enterprise splits applications across clouds to manage capacity. This scenario is similar to the scenario above except for the type of application moved is more complex, so is split out to prioritize differently. The company decides to have a relationship with the cloud provider for splitting applications into the cloud (a form of bursting). In this case, a large application was pre-identified as a bursting candidate. When the capacity reaches the threshold, 50 of the 100 worker instances are automatically moved to the public cloud. The application is now split across two appliance instances or cloud instances, with all monitoring and billing data being sent to the starting instance so it can be centrally managed. A cloud appliance in the enterprise's own datacenter has troubleshooting tools to help debug possible issues of split applications (e.g., networking issues, network bandwidth/latency issues, fabric communication, and so on). When the capacity situation has subsided on the appliance, the 50 worker instances are moved back to the appliance and it is a normally functioning application again.

In another example, a cloud provider decides to burst from one cluster to another. The public cloud capacity planning team decides that a cluster in the Chicago datacenter is critically full but wants to maintain high utilization. They set up bursting to an underutilized cluster in a West coast datacenter when utilization gets to 90%. The administrator goes into the capacity management tool and chooses appropriate customers/applications (e.g., with low data usage) to be move candidates. The day comes when the usage of the Chicago cluster reaches the threshold and the system automatically moves the selected applications (e.g., 10% of the cluster's apps) to the West coast datacenter for one day. As usage returns below the threshold, the system moves the applications back to Chicago. The system notifies a designated monitoring team proactively of the burst to be able to answer customer questions.

In another example, the system is used for cross-cloud portfolio management. An enterprise decides that to manage capacity efficiently on their cloud appliance, they want to put all variable demand apps in a public cloud and their constant demand applications in the appliance or local datacenter resources (and thus be able to run the appliance at higher utilization). While they want their computing resources split, they still want a global view across all of their application's health, to have their application developers manage applications the same way, and to maintain a single view of departmental billing across both (e.g., what costs to allocate to the consumer sales groups, internal IT, B2B sales, and so forth). The enterprise is able to set up the aggregation accounts with the public cloud with the same groups as the appliance and get billing data to integrate on their side. Similarly, they are able to get application-programming interface (API) access to the public cloud monitoring data for the platform their apps are running on as well as application level monitoring, so their network operation center (NOC) has a complete and consistent view of the state of the computing activity of the enterprise.

In another example, an enterprise sets up a globally distributed application with dynamic load balancing. An enterprise customer wants to manage capacity across two or more cloud instances and has a significant amount of their load in independent but geographically distributed instances (e.g., Bing search with a US and UK datacenter that both serve German queries). Under normal circumstances, a global traffic manager sends 50% traffic to each location. When load gets high at the primary location, the system instructs the load balancer to send 75% of the traffic to the UK system, thus freeing up capacity from the US cloud instance, bringing it to acceptable levels. When capacity returns to normal, the system tells the load balancer to return to the 50/50 split. A variation of this is for the public cloud to be used as a secondary datacenter (with say 1% of load, the customer's site with the appliance to be the other 99%). In the case of a disaster or other reason to move load from the customer's site, 100% of traffic is shifted to the public cloud.

In another example, an enterprise has reached its datacenter's capacity and needs extra computing resources, but does not yet have the available capital to expend to expand the datacenter. In this case, the company can use a public cloud for spillover until they can get the hardware purchase completed.

Figure 2:
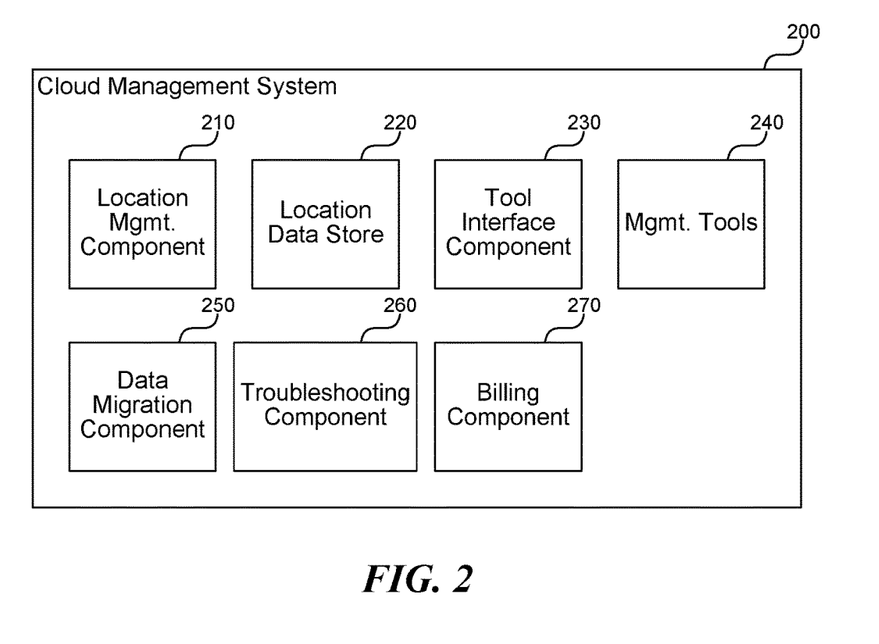
FIG. 2 is a block diagram that illustrates components of the cloud management system, in one embodiment.

FIG. 2 is a block diagram that illustrates components of the cloud management system, in one embodiment. The system 200 includes a location management component 210, location data store 220, tool interface component 230, one or more management tools 240, a data migration component 250, a troubleshooting component 260, and a billing component 270. Each of these components is described in further detail herein.

The location management component 210 manages information about multiple datacenter locations at which instances of an application are running. The component 210 includes information describing how to reach each location, connections available for retrieving management information, user accounts to use for each location with associated security credentials, application and datacenter components from which to gather troubleshooting information and send troubleshooting commands, and so forth. The location management component 210 receives information describing any migration of application loads or bursting from one datacenter/cloud to another and updates the managed information so that the component 210 has a complete picture of all of the locations where the application is running. This allows the system 200 to present the complete picture and to make management of applications uniform, no matter where or at how many locations the applications are running. As conditions change and applications are distributed, the location management component 210 can present management tools with a comprehensive set of management data.

The location data store 220 stores information that describes locations at which instances of the application are running. The data store 220 may include one or more files, file system, hard drives, databases, cloud-based storage services, or other facilities for persisting information between sessions with the system 200. The stored information may include connection information, user roles, sources of management data, available log files, and any other information related to management or troubleshooting of applications distributed to multiple locations.

The tool interface component 230 provides an interface to the system 200 through which one or more tools can access management and troubleshooting information for the application. The interface may include one or more web pages, web services, application-programming interfaces (APIs), or other interfaces through which an administrator or tools can directly or programmatically access management and troubleshooting information of the system 200. In some embodiments, the tool interface component 230 provides an initial connection point for tools to access information related to the application at a cloud-computing appliance located within an enterprise's private datacenter. The appliance may manage migration and distribution of application loads to a public cloud or other datacenter, and provides a central point of contact for tools that gather management information or provide application troubleshooting.

One or more management tools 240 connect to the tool interface component 230 to access management information or perform application troubleshooting. The tools may include log viewers, reporting tools, debugging tools, or other tools that display information about or assist in resolving problems with a running application. The management tools 240 may include tools designed to work with a local application, and the system 200 provides the tools with information describing a distributed application running at multiple locations without the tool's knowledge. This allows existing tools that administrators rely upon to be used even as automatic application load migration is introduced into a datacenter or cloud. In other cases, tools may be specifically written to understand distributed applications and to provide specific management information or troubleshooting related to multiple locations. The tool interface component 230 may provide multiple interfaces through which management tools 240 connect to the system 200 using paradigms that are understood by each tool.

The data migration component 250 migrates management information at one or more remote locations where the application is running back to a home location of the application. The home location may include a private datacenter, location or a cloud-computing appliance, or other location where the application normally runs under steady conditions. Upon hitting a certain level of load (e.g., peak or periodic bursts), the application may migrate some load to one or more other datacenters or public clouds to help satisfy client requests. These other locations generate management data, such as log files, transaction data, and so on, just like the home location, and the data migration component 250 migrates this data back to the home location or provides access to the data from the home location, so that the management tools 240 can provide a comprehensive picture of the application's activity to administrators.

The troubleshooting component 260 performs troubleshooting tasks on the application at one or more locations. Troubleshooting may include debugging, processing test data, or other forms of determining whether an application is operating correctly. Troubleshooting is generally well understood at the home location, but becomes more complex as an application begins to span multiple datacenters or clouds. The cloud management system 200 isolates management tools 240 and administrators from this complexity by providing a uniform interface through which tools and administrators access management information and perform troubleshooting at multiple locations. Thus, if a management tool allows an administrator to place a breakpoint at or receive trace information from a particular piece of application code at the home location, then the troubleshooting component 260 makes it just as easy to do so at a remote cloud-based instance of the application. The tools and administrator may even be unaware of all of the locations where the application is running, but can still perform management tasks as if the application were only executing at the home location.

The billing component 270 reports billing information related to one or more locations where an application is running. One common management task is to manage computing costs, and public clouds often charge based on metrics related to workload (e.g., computing time, storage space used, and so forth). It may be useful for an administrator to gather a picture of the costs that application instances are incurring at various locations, and the cloud management system 200 can optionally provide the billing component 270 to gather this type of information so that the information can be reported through management tools and reports.

The computing device on which the cloud management system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
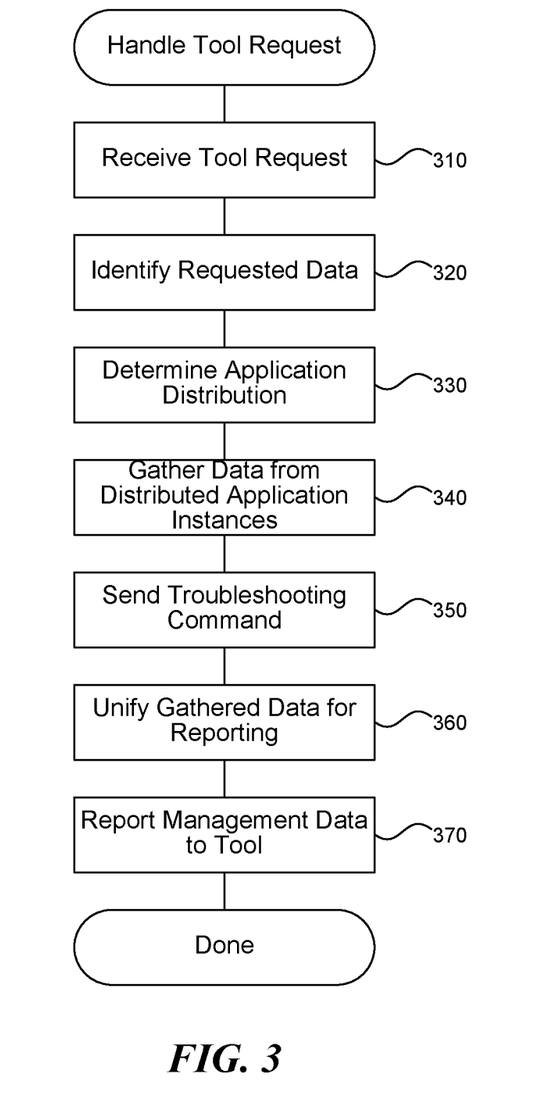
FIG. 3 is a flow diagram that illustrates processing of the cloud management system to handle a request from a management tool to access data from distributed application instances, in one embodiment.

FIG. 3 is a flow diagram that illustrates processing of the cloud management system to handle a request from a management tool to access data from distributed application instances, in one embodiment. Beginning in block 310, the system receives from a management tool a request to access management data related to an application running instances in one or more datacenters. For example, a performance-monitoring tool may request status information describing how many client requests the application is handling, resource usage of the application, or other information from the application. The system may receive the tool request through an API the system exposes to tools for requesting management data. The API may comprise a uniform interface for accessing management data irrespective of where or at how many locations application instances are running.

Continuing in block 320, the system identifies one or more types of management data that satisfy the received request. For example, the system may determine that the request asks for log information that is produced by each instance of the application. Identifying the requested data allows the system to determine which information to gather from each application instance or whether the data is already gathered locally from data pushed to a central location by each application instance.

Continuing in block 330, the system determines a distribution of the application that includes two or more instances of the application. The distribution determines where the application is running and where the system will find management data to satisfy the request. The system may include a data store that tracks information describing each burst or other migration of application load to and from other datacenters, so that the system is aware of each location where application instances are running. Upon receiving the management tool request, this information allows the system to determine from where to gather management data.

Continuing in block 340, the system gathers management data to satisfy the request from each distributed application instance. The instances may include an instance in a local private datacenter, a remote private datacenter, a private cloud computing facility, a public cloud computing facility, spare resources offered by other private datacenters, and so on. The system contacts each instance of the application or accesses previously sent information from each instance that contains information (such as performance data, failures, and so forth) to satisfy the received management tool request.

Continuing in block 350, the system optionally sends one or more troubleshooting commands to one or more remote application instances. For example, if one location is experiencing failures, the administrator may use a management tool to request additional trace information, to send one or more test requests, or to perform other types of debugging. The remote application instances carry out the troubleshooting commands and report requested data back to a central location where the management tool can access the information.

Continuing in block 360, the system unifies gathered data to provide a uniform response to the received management tool request. In this way, management tools need not be written to include an understanding of the various potential distributions of applications managed by the tools. The system can thus freely migrate the application from location to location or to multiple locations as needed to handle application loads, while still providing administrators with a straightforward management and troubleshooting experience.

Continuing in block 370, the system reports the gathered and unified management data in response to the received management tool request. The system may send the data through the interface on which the request was received or through a notification interface or other facility for providing data to the tool. After block 370, these steps conclude.

Figure 4:
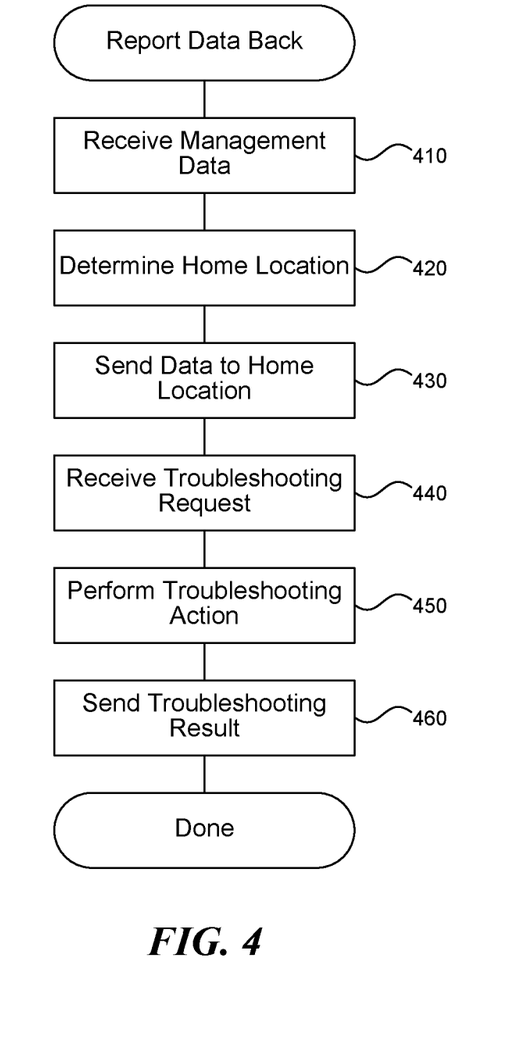
FIG. 4 is a flow diagram that illustrates processing of the cloud management system to report data back from and handle troubleshooting requests at a location of a remote application instance, in one embodiment.

FIG. 4 is a flow diagram that illustrates processing of the cloud management system to report data back from and handle troubleshooting requests at a location of a remote application instance, in one embodiment. Beginning in block 410, the system receives management data at a remote application instance handling a portion of load generated by requests from clients of the application. The management data may include performance data, log information, error details, statistical information, sales history, or other indications of application operation useful for management the application.

Continuing in block 420, the system determines a home location of the application where an administrator can access management data reported by multiple instances of the application running at distributed remote locations. The application instance may receive configuration information from the home location upon creation of the instance that specifies where the home location can be contacted and that the application instance is a remote instance of the application. The system may migrate applications to multiple locations to handle peak loads, perform low priority tasks at locations where processing is off-peak and thus cheaper, or for other reasons determined by an administrator. The application may have a home location that is where the application normally runs and may handle peak or other loads at one or more distributed remote locations.

Continuing in block 430, the system sends the received management data from the remote application instance to the determined home location of the application. The system may periodically migrate data generated at distributed instances back to the home location so that management data is available in one place at the home location for the convenience of administrators and management tools. The system may also migrate data on demand or as requested by various tools (see, e.g., FIG. 3). In some cases, the system may burst application loads to remote locations for short durations and then collect information related to the application's execution when the loads are migrated back to the home location and the remote instances are finished.

Continuing in block 440, the system optionally receives a troubleshooting request from a management tool run at the home location to troubleshoot the remote application instance. The troubleshooting requests may include debug breakpoints, a request for detailed trace information, or other commands or requests to perform troubleshooting actions.

Continuing in block 450, the system performs one or more troubleshooting actions in response to the received troubleshooting request. The action may include setting a debug breakpoint, turning up a logging level, sending test data to the application, or performing any other action specified by the request for determining whether the application is operating properly.

Continuing in block 460, the system sends a troubleshooting result to the home location in response to the received troubleshooting request. By providing a facility for executing troubleshooting commands remotely, the system allows a troubleshooting tool operating at the home location to troubleshoot application instances no matter where the instances are running, and allows the system to seamlessly migrate instances of the application to various locations without interrupting the ability of an administrator to manage and troubleshoot the application. After block 460, these steps conclude.

In some embodiments, the cloud management system migrates application load by modifying domain name service (DNS) records. The system may modify a DNS server to point incoming client requests to one or more new destination Internet Protocol (IP) addresses to direct loads away from a source datacenter over to a target datacenter/cloud. A global traffic manager (GTM) often points clients to the nearest server for handling their requests, and these solutions can be modified to redirect traffic based on load or other conditions. Thus, when one datacenter becomes overloaded or near capacity, the system may inform the GTM to direct at least some client requests to a new location that can handle the excess load. Similarly, the system may provide a DNS or other address to which management tools can address management requests and be connected to application instances no matter where they reside.

In some embodiments, the cloud management system migrates log and other data back from the target computing resources after migration conditions have eased. For example, following a period of peak load, the system may migrate all application loads back to the original datacenter, and may pull information generated at the target datacenter, such as application logs, back to the original datacenter for later analysis. For some applications, tracking client requests may be a matter of regulatory compliance or simply useful for debugging and reporting. In either case, consolidating the logs at the source location may be part of a successful migration back to the source location.

In some embodiments, the cloud management system allocates a dynamically variable amount of application load between a source computing resource and one or more target computing resources. For example, the system may dynamically route requests to keep the source computing resource at or near full capacity and only send requests out to external computing resources that the source computing resource could not successfully handle. Such decisions may be a matter of cost, data safety, or other considerations to migrate out as little application load as needed or to place application loads where they can be performed cheapest or most efficiently. In some cases, the decisions may be based on regulatory requirements of applications. For example, applications subject to healthcare or other recordkeeping laws may have restrictions about the datacenters/clouds in which they can operate.

In some embodiments, the cloud management system provides various options for disaster recovery. In some cases, the system may enlist resources at an external datacenter to monitor a main datacenter for outages. If the external datacenter becomes unable to reach the main datacenter, then the external datacenter may determine that a disaster has occurred and move application loads to the external datacenter. In past systems, it was typical for an organization to maintain 200% of needed capacity (at substantial expense) in order to successfully handle disasters. With the cloud management system, the organization can maintain a lower amount of available capacity at a second location (e.g., 10%) and can rapidly request more as needed in the event of a failure. Much like insurance, the likelihood of all clients of a cloud provider failing at the same time and requesting a high capacity spare is low, such that multiple clients can share a set of redundant secondary resources to be used in the event of failure of primary resources. The system may also re-home management tools and troubleshooting resources to point to the new location following disaster recovery so that management continues uninterrupted.

From the foregoing, it will be appreciated that specific embodiments of the cloud management system have been described herein for purposes of illustration, but that various modifications may be made without deviating from the spirit and scope of the inventon. Accordingly, the invention is not limited except as by the appended claims.

We claim:

1. A computer-implemented method for reporting management data, the method comprising:
   receiving from an application management tool a management tool request to access management data for a distributed application having instances running in two or more datacenters;
   identifying one or more types of the management data that satisfy the received management tool request;
   determining a particular datacenter of the two more datacenters at which each of two or more instances of the distributed application is running;
   gathering the management data from each from the two or more instances;
   unifying the gathered management data into a uniform response to the received management tool request; and
   reporting the gathered and unified management data in response to the received management tool request,
   wherein the preceding steps are performed by at least one processor.

2. The method of claim 1, wherein receiving the management tool request comprises receiving the management tool request through a programmatic application programming interface (API) for requesting management data.

3. The method of claim 2, wherein the API comprises a uniform interface for accessing the management data, and wherein the uniform interface is abstracted from at least one of where or at how many locations instances are running.

4. The method of claim 1, wherein identifying the one or more types of the management data comprises determining that the management tool request relates to information produced by each of the at least two instances of the application.

5. The method of claim 1, wherein identifying the one or more types of the management data comprises determining which information to gather from each instance of the two or more instances and whether the one or more types of the management data was already gathered locally from data pushed to a central location by each instance of the two or more instances.

6. The method of claim 1, wherein determining the particular datacenter comprises determining where the application is running and where the system will find the management data.

7. The method of claim 1, wherein gathering the management data comprises accessing at least one instance in a private datacenter and at least one instance in a cloud computing facility.

8. The method of claim 1, wherein gathering the management data comprises contacting each of the at least two instances of the application for information responsive to the received management tool request.

9. The method of claim 1, further comprising:
sending one or more troubleshooting commands to one or more remote application instances, wherein the one or more troubleshooting commands request that the remote application instances perform at least one troubleshooting operation and report requested data back to a central location.

10. The method of claim 1, wherein unifying the gathered data comprises formatting the gathered data for use by the management tool, and wherein the management tool need not be aware of the distributions of applications.

11. The method of claim 1, wherein unifying the gathered data comprises formatting the gathered data so that the computer system can migrate the application amongst locations based at least in part on application loads while providing a consistent management and troubleshooting interface.

12. The method of claim 1, wherein reporting the gathered and unified management data comprises sending the data to the management tool through an interface via which the management tool request was received.

13. A computer-implemented method for handling troubleshooting requests, the method comprising:
receiving management data at a remote application instance that handles a portion of a work load generated by requests from clients of a distributed application running instances at one or more distributed remote locations;
determining a home location of the distributed application, wherein the home location is a location at which the management data reported by multiple instances of the distributed application is made available for access;
sending the received management data from the remote application instance to the determined home location of the distributed application;
receiving a troubleshooting request from a management tool run at the home location to troubleshoot the remote application instance;
performing one or more troubleshooting actions in response to the received troubleshooting request; and
sending a troubleshooting result to the home location in response to the received troubleshooting request,
wherein the preceding steps are performed by at least one processor.

14. The method of claim 13, wherein the management data includes at least one indication of application operation.

15. The method of claim 14, wherein the indication includes at least one of performance data, log information, error details, statistical information, or sales history.

16. The method of claim 13, further comprising:
receiving configuration information from the home location upon creation of the remote application instance.

17. The method of claim 16, further comprising:
receiving information indicating that the remote application instance is a remote instance of the distributed application.

18. The method of claim 13, further comprising:
migrating the distributed application to multiple locations in response to an indication that processing is to be performed at the multiple locations.

19. The method of claim 13, wherein sending the received management data from the remote application instance is migrated from the remote location to the home location.

20. The method of claim 13, wherein sending the received management data from the remote application instance is migrated from the remote location to the home location in response to loads being migrated to the home location from the remote location.

* * * * *